US00RE49073E

(19) United States
(12) Reissued Patent
Lambach et al.

(10) Patent Number: US RE49,073 E
(45) Date of Reissued Patent: May 17, 2022

(54) FOAM WALL STRUCTURE

(71) Applicant: COVESTRO LLC, Pittsburgh, PA (US)

(72) Inventors: James Lambach, McMurray, PA (US); William J. Nicola, Burgettstown, PA (US); Eric Giles, Pittsburgh, PA (US); Anthony Grisolia, West Leechburg, PA (US); Bradley W. Oberg, Cranberry, PA (US)

(73) Assignee: Covestro LLC, Pittsburgh, PA (US)

(21) Appl. No.: 17/099,865

(22) Filed: Nov. 17, 2020

Related U.S. Patent Documents

Reissue of:
(64) Patent No.: 10,370,849
Issued: Aug. 6, 2019
Appl. No.: 14/494,971
Filed: Sep. 24, 2014

U.S. Applications:
(60) Provisional application No. 61/883,312, filed on Sep. 27, 2013.

(51) Int. Cl.

| | |
|---|---|
| ***E04C 2/20*** | (2006.01) |
| ***B29C 44/12*** | (2006.01) |
| ***E04B 1/10*** | (2006.01) |
| ***E04C 2/38*** | (2006.01) |
| ***E04B 2/00*** | (2006.01) |

(Continued)

(52) U.S. Cl.
CPC ..... *E04C 2/205* (2013.01); *B29C 44/12* (2013.01); *E04B 1/10* (2013.01); *E04C 2/386* (2013.01); *E04B 1/80* (2013.01); *E04B 2/02* (2013.01); *E04C 2/46* (2013.01); *Y10T 428/233* (2015.01)

(58) Field of Classification Search
CPC . E04C 2/205; E04C 2/386; E04C 2/46; B29C 44/12; E04B 1/10; E04B 1/80; E04B 2/02; E04B 2/28; Y10T 428/233
See application file for complete search history.

(56) References Cited

U.S. PATENT DOCUMENTS 1,649,872 A * 11/1927 Swisher ..... E04B 2/56 52/281
3,258,889 A * 7/1966 Butcher ..... E04C 2/386 264/263

(Continued)

FOREIGN PATENT DOCUMENTS

WO WO-2012174377 A1 * 12/2012 ..... E04B 1/665

*Primary Examiner* — William C Doerrler
(74) *Attorney, Agent, or Firm* — Donald R. Palladino

(57) ABSTRACT

A foam wall structure includes a frame, at least one primary support member, a slab of polyiso board and a foam layer. The frame can include: a first member, a second member spaced apart from the first member; and two side members extending between the first and second members. The frame defining a front frame surface and an opposite rear frame surface. The at least one primary support member can be positioned between the two side members and extend between the first and second member. The primary support member defines a front support surface and an opposite rear support surface. The slab of polyiso board may be attached to the front frame surface. The foam layer can be received within at least a portion of the frame and overlies the front surface of the primary support member. A method of making a foam wall structure and a pre-fabricated wall is also disclosed.

43 Claims, 13 Drawing Sheets

(51) Int. Cl.
*E04B 1/80* (2006.01)
*E04B 2/02* (2006.01)

(56) References Cited

U.S. PATENT DOCUMENTS 3,641,724 A * 2/1972 Palmer ..... E04C 2/386 156/78
3,885,008 A * 5/1975 Martin ..... E04C 2/386 156/245
4,068,434 A * 1/1978 Day ..... E04C 2/386 52/220.1
4,185,437 A * 1/1980 Robinson ..... E04C 2/384 264/256
4,223,502 A * 9/1980 Robinson ..... B28B 1/32 52/315
4,471,591 A * 9/1984 Jamison ..... E04B 1/10 264/46.4
4,786,547 A * 11/1988 St-Michel ..... B32B 21/02 428/215
5,192,598 A * 3/1993 Forte ..... B32B 5/18 156/78
5,345,738 A * 9/1994 Dimakis ..... B32B 5/18 428/534
5,737,895 A * 4/1998 Perrin ..... E04C 2/384 52/236.8
5,765,330 A * 6/1998 Richard ..... E04C 2/386 52/265
6,205,729 B1 * 3/2001 Porter ..... B32B 29/00 52/220.1
6,209,284 B1 * 4/2001 Porter ..... E04B 1/26 52/268
6,279,284 B1 * 8/2001 Moras ..... E04B 1/10 52/105
6,308,491 B1 * 10/2001 Porter ..... B32B 5/18 52/309.16
6,481,172 B1 * 11/2002 Porter ..... B32B 5/18 428/317.7
6,571,523 B2 * 6/2003 Chambers ..... E04B 1/14 52/270
6,715,249 B2 * 4/2004 Rusek ..... E04B 1/762 428/105
7,168,216 B2 1/2007 Hagen, Jr.
7,574,837 B2 * 8/2009 Hagen, Jr. ..... B29C 44/186 52/309.7
7,640,700 B2 * 1/2010 Starke ..... E04C 2/521 52/220.2
8,091,297 B2 * 1/2012 Tiberi ..... E04B 2/707 52/204.2
8,307,608 B2 * 11/2012 Harig ..... B67D 7/0272 52/481.1
8,359,808 B2 * 1/2013 Stephens, Jr. ..... E04B 1/165 52/220.2
8,793,952 B2 * 8/2014 Olang ..... E04B 1/7604 428/309.9
9,234,355 B2 * 1/2016 Sealock ..... E04F 13/08
2004/0148889 A1 * 8/2004 Bibee ..... E04B 1/78 52/481.1
2005/0066620 A1 * 3/2005 Albora ..... E04B 2/707 52/782.1
2005/0222289 A1 * 10/2005 Miller ..... B29C 44/468 521/155
2007/0074474 A1 * 4/2007 Jannelle ..... E04B 1/7604 52/309.4
2010/0011701 A1 1/2010 Cole et al.
2011/0173911 A1 7/2011 Propst
2013/0104480 A1 5/2013 Smith
2014/0075872 A1 * 3/2014 Mercado ..... E04B 2/58 52/309.9
2014/0115991 A1 * 5/2014 Sievers ..... E04B 2/562 52/309.4

* cited by examiner

FOAM WALL STRUCTURE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION(S)

This Application *is a reissue application of U.S. application Ser. No. 14/494,971, filed Sep. 24, 2014, which issued as U.S. Pat. No. 10,370,849 B2, which* claims the benefit of the filing date of U.S. Provisional Application Ser. No. 61/883,312, filed Sep. 27, 2013, entitled "Foam Wall Structure".

BACKGROUND OF THE INVENTION

Field of the Invention

The present invention relates generally to wall systems, and, in particular, to a foam wall structure.

Description of Related Art

Insulated wall panels provide thermal insulation for residential homes and buildings. A wall panel's R-value is its ability to impede heat flow. The greater the ability to impede heat flow, the higher the R-value. Over the years, insulation standards have become more strict, requiring higher R-values and continuous insulation on the exterior side of insulated wall panels. The current market solutions to these stricter requirements are (1) pre-fabricated wall panels that incorporate insulation at the construction site, and (2) Structural Insulated Panels (SIPs).

The pre-fabricated wall panel that incorporates insulation at the construction site is the more widely adopted solution in the market. However, pre-fabricated wall panels that incorporate high-quality insulation at the construction site require a separate sub-contractor for on-site installation with fiberglass batting, which is known to have suboptimal R-values. Fiberglass is not an air barrier and allows for air intrusion, thus, increasing the probability of condensation and mold growth within wall systems. Furthermore, additional material is necessary to finish the wall (e.g., Oriented Strand Boards (OSBs) and house wrap), and the overall construction process duration is extended, thereby, increasing possible risk of trade scheduling conflicts, installing insulation onsite also leads to potential inconsistencies in insulation installation, performance, risk, and usage.

The second solution, SIPs, also have several drawbacks. SIPs typically utilize expanded polystyrene (EPS) foam insulation sandwiched between two OSB boards, which only provide thermal performance of about R-4 per inch.

Additionally, current SIPs are mainly used by smaller scale home builders with high levels of home customization.

A need, therefore, exists for an insulated wall structure that satisfies the strict industry insulation requirements and that can be made without excessive material and labor costs.

SUMMARY OF THE INVENTION

The present invention is directed to a foam wall structure comprising:

a) a frame comprising:

a first member;

a second member spaced apart from the first member; and two side members extending between the first and second members, wherein the first member, second member, and two side members each have a front surface and a rear surface that form the front frame surface and the rear frame surface of the frame;

b) at least one primary support member positioned between the two side members and extending between the first and second member, wherein the primary support member defines a front primary support surface and an opposite rear primary support surface corresponding to the front frame surface and rear frame surface;

c) a slab of polyiso board having a front face and a rear face, and a facer material attached to at least a portion of at least one of the front face and the rear face, wherein the slab of polyiso board is attached to at least a portion of the front frame surface and optionally the front primary support surface of the at least one primary support members, such that the polyiso board, the first and second members, the two side members and the at least one primary support members define one or more voids within the frame;

d) a foam layer received within at least a portion of one of the voids within the frame, wherein the foam layer adheres to at least a portion of the poly iso board.

The present invention also includes a method of manufacturing a foam wall structure comprising:

a) providing a frame with at least one primary support member comprising:

i) a first member;

ii) a second member spaced apart from the first member;

iii) two side members extending between the first and second members, the frame defining a front frame surface and an opposite rear frame surface, wherein the first member, second member, and two side members each have a front surface and a rear surface that form the front frame surface and the rear frame surface of the frame; and iv) at least one primary support member positioned between the two side members and extending between the first and second member, wherein the primary support member defines a front primary support surface and an opposite rear primary support surface corresponding to the front frame surface and rear frame surface;

a) providing a slab of polyiso board;

c) orientating the front frame surface over the polyiso board such that the front frame surface is substantially parallel to the rear face of the slab of poloyiso board;

d) attaching the polyiso board to the front frame surface;

e) depositing foam material into the frame; and f) allowing the foam material to expand within at least a portion of the frame.

The present invention is also directed to a foam wall structure made according to the methods described herein.

DESCRIPTION OF THE PREFERRED EMBODIMENTS

Figure 2:
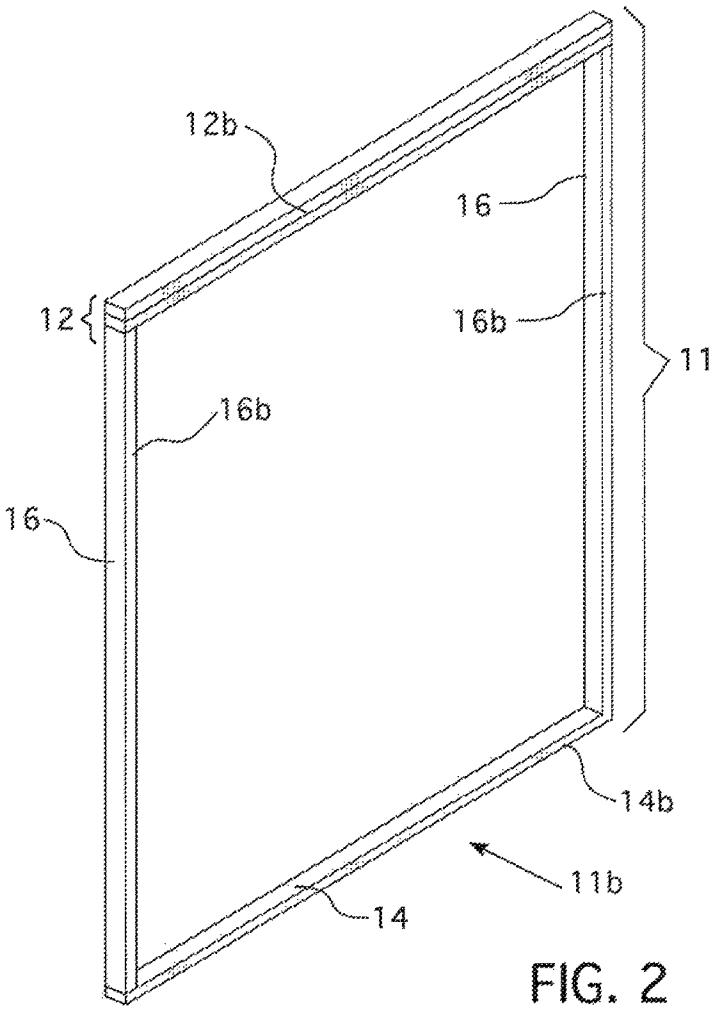
FIG. 2 is a rear perspective view of the frame of FIG. 1 according to one embodiment of the present invention.

Various embodiments are described and illustrated in this specification to provide an overall understanding of the structure, function, operation, manufacture, and use of the disclosed products and processes, it is understood that the various embodiments described and illustrated in this specification are non-limiting and non-exhaustive. Thus, the invention is not limited by the description of the various non-limiting and non-exhaustive embodiments disclosed in this specification. Rather, the invention is defined solely by the claims. The features and characteristics illustrated and/or described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. Therefore, any such amendments comply with the requirements of 35 U.S.C. § 112, first paragraph, and 35 U.S.C. § 132(a). The various embodiments disclosed and described in this specification can comprise, consist of; or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof; that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference throughout this specification to "various non-limiting embodiments," or the like, means that a particular feature or characteristic may be included in an embodiment. Thus, use of the phrase "in various non-limiting embodiments," or the like, in this specification does not necessarily refer to a common embodiment, and may refer to different embodiments. Further, the particular features or characteristics may be combined in any suitable manner in one or more embodiments. Thus, the particular features or characteristics illustrated or described in connection with various embodiments may be combined, in whole or in part, with the features or characteristics of one or more other embodiments without limitation. Such modifications and variations are intended to be included within the scope of the present specification. In this manner, the various embodiments described in this specification are non-limiting and non-exhaustive.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges subsumed within the recited range. For example, a range of "1 to 10" is intended to include all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112, first paragraph, and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

Figure 1:
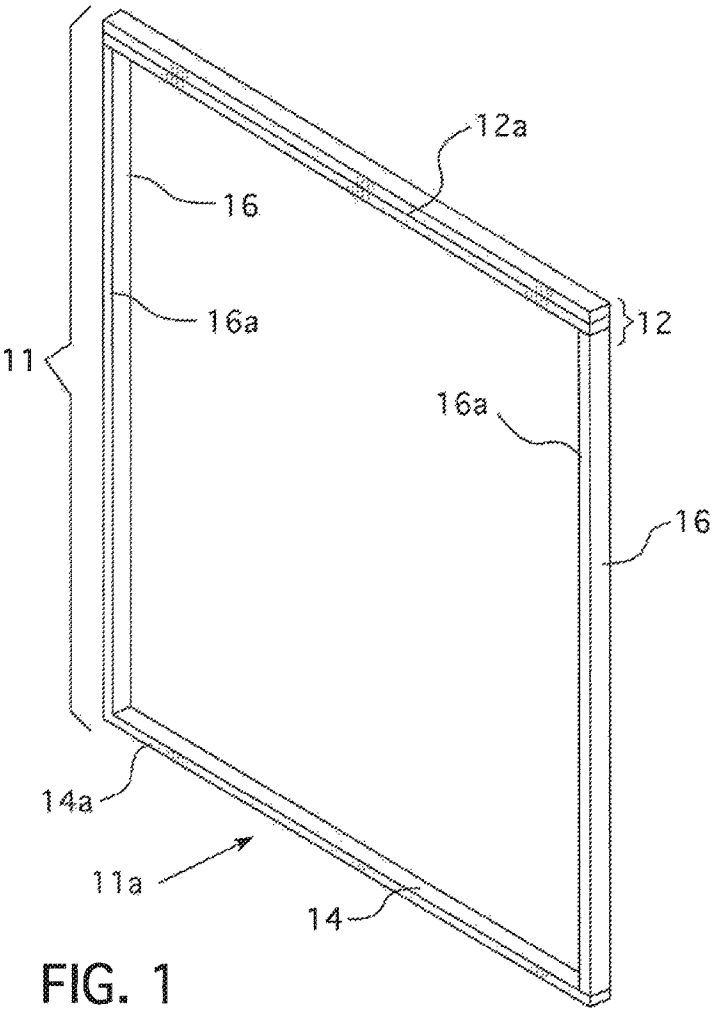
FIG. 1 is a front perspective view of a frame according to one embodiment of the present invention.

As indicated, in certain embodiments, the present invention is directed to a foam wall structure 10 that includes a frame 11, at least one primary support member 17, a slab of polyiso board 70 and a foam layer 30. In certain embodiments, as shown in FIGS. 1-2, the frame 11 may be defined by a first member 12, a second member 14 spaced apart from the first member 12, and two side members 16 extending between the first member 12 and the second member 14. In certain embodiments, the first member 12, second member 14, and two side members 16 each have a front surface 12a, 14a, 16a and a rear surface 12b, 14b, 16b that define a front frame surface 11a and a rear frame surface 11b, respectively.

The frame 11 can be constructed into different shapes depending on its intended use. In certain embodiments, as shown in FIGS. 1-2, the frame 11 can be constructed as a conventional industry standard rectangular or square frame 11. For example, as shown in FIGS. 1-2, the first member 12 and second member 14 may be spaced apart and extend parallel to each other, and the two side members 16 may extend perpendicular to the first member 12 and second member 14 so as to from a rectangular or square frame 11. The shape and design of the frame 11 is not so limited and can be constructed into any desired shape. Generally, the shape and design of the frame 11 is constructed in accordance with the floor plans designed for a particular home or building.

Figure 4:
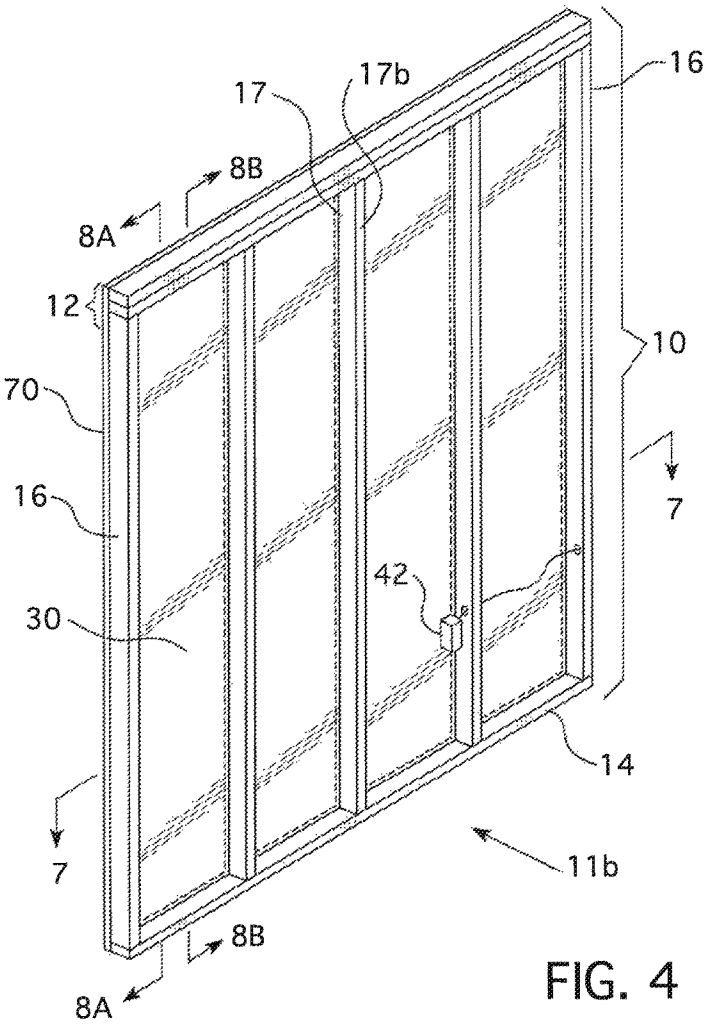
FIG. 4 is rear perspective view of the foam wall structure of FIG. 4 according to one embodiment of the present invention.
Figure 3:
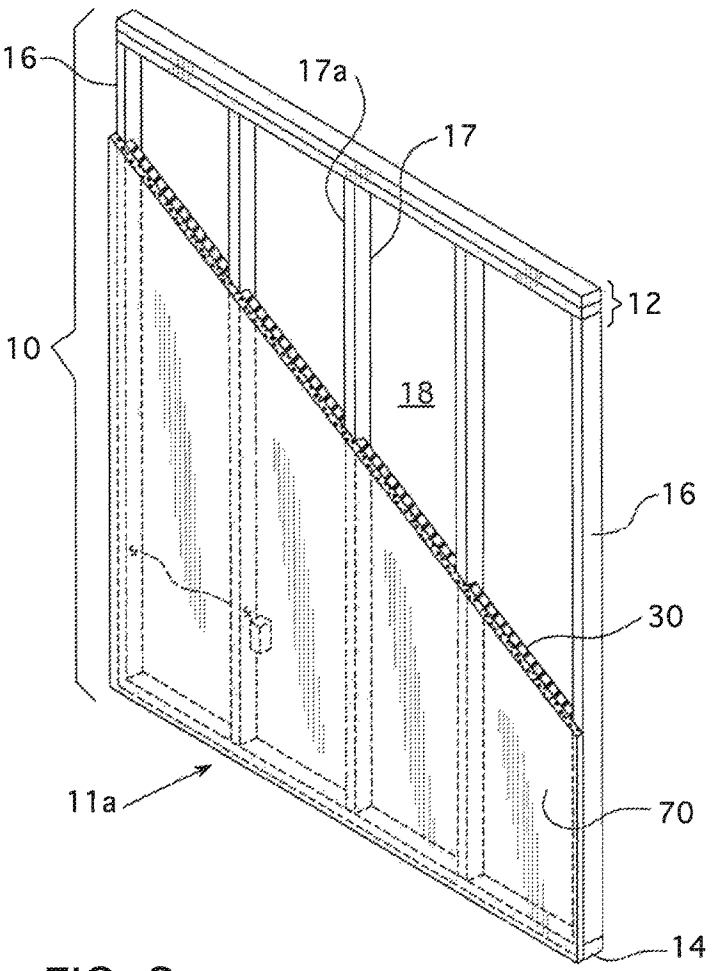
FIG. 3 is a front perspective view of a foam wall structure according to one embodiment of the present invention.

Referring to FIGS. 1-4, in certain embodiments, at least one primary support member 17 may be positioned between the two side members 16. The primary support members 17 may extend between the first member 12 and the second member 14. The primary support members 17 may define a front primary support surface 17a and a rear primary support surface 17b. As shown in FIGS. 3-4, in certain embodiments, the front primary support surface 17a and rear primary support surface 17b correspond to the front frame surface 11a and rear frame surface 11b of the frame 11.

Referring again to FIGS. 3-4, in certain embodiments, the primary support members 17 may be spaced apart to form cavities 18. The cavities 18 may be defined by the area formed within the frame 11 between the primary support members 17, side members 16, first member 12, and/or second member 14. The size of each cavity 18 will vary based on the size of the frame 11, the distance between consecutively positioned primary support members 17, and the number of primary support members 17 present.

Further, the primary support members 17, side members 16, first member 12, and/or second member 14 may comprise one or more plates, boards, beams, or the like. For example, as shown in FIGS. 1-4, the first member 12 may include two plates.

In certain embodiments, the two side members 16 and/or primary support members 17 are fixedly engaged to the first member 12 and second member 14. For instance, in certain embodiments, the two side members 16 and/or primary support members 17 are fixedly engaged to the first member 12 and second member 14 with fasteners. Suitable fasteners that can be used with the present invention include, but are not limited to, nails, staples, bolts, screws, and rivets. The first member 12, second member 14, two side members 16, and primary support members 17 can be made of various materials. For example, the first member 12, second member 14, two side members 16, and primary support members 17 can be made of wood, metal, fiberglass, plastic, or a combination thereof. The first member 12, second member 14, two side members 16, and primary support members 17 can be made of the same material or different materials.

Further, the dimensions of the first member 12, second member 14, two side members 16, and primary support members 17 will vary depending on the intended use of the frame 11. The first member 12, second member 14, two side members 16, and primary support members 17 can each have any dimension. In certain embodiments, the first member 12, second member 14, two side members 16, and primary support members 17 have the same dimensions. For example, the first member 12, second member 14, two side members 16, and primary support members 17 may have the same width and height dimensions. In one non-limiting embodiment, the first member 12, second member 14, two side members 16, and primary support members 17 all have a width and height dimension of nominally 2×4 inches. In another non-limiting embodiment, the first member 12, second member 14, two side members 16, and primary support members 17 all have a width and height dimension of nominally 2×6 inches.

In certain embodiments, the first member 12, second member 14, and two side members 16 have the same dimensions that are different from the dimensions of the primary support members 17. For example, the first member 12, second member 14, and two side members 16 may have the same width and height dimensions, and the primary support members 17 may have width and height dimensions that are different from the first member 12, second member 14, and two side members 16. In one non-limiting embodiment, the first member 12, second member 14, and two side members 16 have a width and height dimension of nominally 2×6 inches, and the primary support members 17 have a width and height dimension of nominally 2×4 inches.

Figure 6:
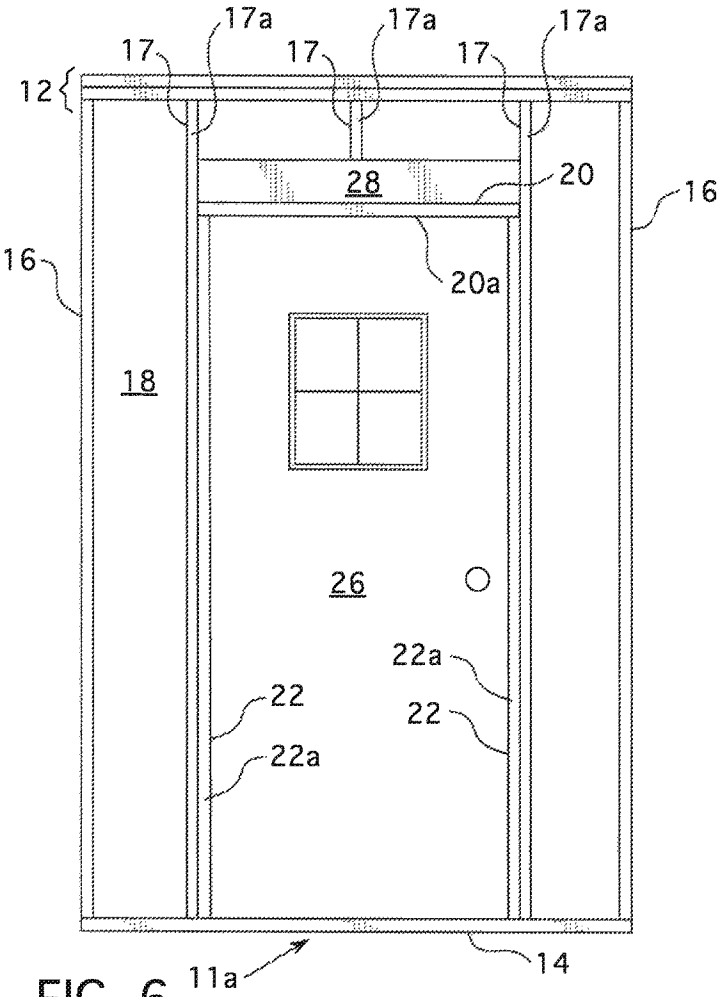
FIG. 6 is a front view of a frame with a door according to one embodiment of the present invention.
Figure 5:
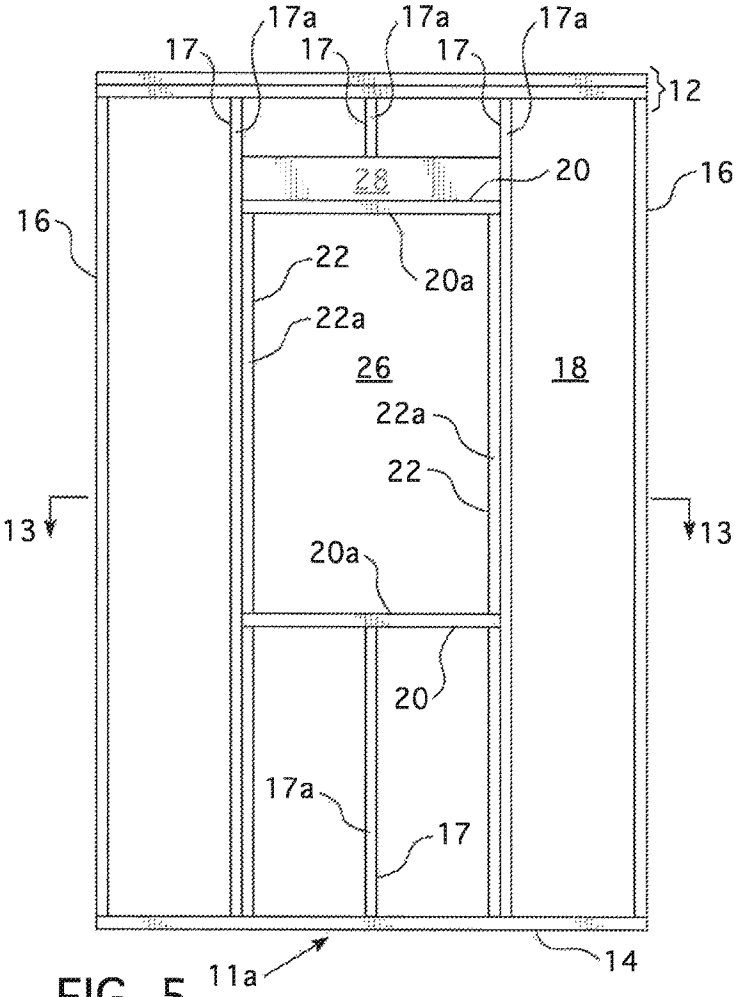
FIG. 5 is a front view of a frame with a window according to one embodiment of the present invention.

In addition to the above, and as shown in FIGS. 5-6, one or more secondary support members 20 and/or tertiary support members 22 may be used. The secondary support members 20 and tertiary support members 22 may comprise one or more plates, boards, beams, or the like. The secondary support members 20 and tertiary support members 22 can be incorporated into the frame 11 to provide structural support, to form spaces for windows and doors, and the like. Further, the secondary support members 20 and tertiary support members 22 can have dimensions that are the same or different from the primary support members 17, side members 16, first member 12, and/or second member 14. In one embodiment, the secondary support members 20 and tertiary support members 22 have greater lengths than the primary support members 17, side members 16, first member 12, and/or second member 14.

As shown in FIGS. 5-6, the secondary support members 20 may have a front secondary support surface 20a and a rear secondary support surface (not shown) that correspond with the front and rear frame surface 11a, 11b and the front and rear primary support surface 17a, 17b. Similarly, the tertiary support members 22 may have a front tertiary support surface 22a and a rear tertiary support surface 22b (shown in FIG. 17) that correspond with the front and rear frame surface 11a, 11b and the front and rear primary support surface 17a, 17b.

In certain embodiments, the secondary support members 20 extend between and attach to primary support members 17, or alternatively, the secondary support members 20 extend between and attach to a primary support member 17 and a side member 16. In sonic embodiments, tertiary support members 22 extend between two secondary support members 20 or between a secondary support member 22 and the first member 12 and/or second member 14.

In certain embodiments, the secondary support members 20, tertiary support members 22, primary support members 17, side members 16, first member 12, and/or second member 14 form a secondary cavity 26. As shown in FIGS. 5-6, the secondary cavity 26 can be used as a space for a window, door or any other opening. For example, in certain embodiments, the secondary support members 20, tertiary support members 22, primary support members 17, side members 16, first member 12, and second member 14 can be constructed as a conventional industry standard rectangular or square wall panel having a window, door, or any other opening. For example, referring to FIG. 5, a rectangular or square wall panel having a window can be formed as follows: a first member 12 and second member 14 may be spaced apart and extend parallel to each other; two side members 16 may extend between the first member 12 and second member 14 in a direction perpendicular to the first member 12 and second member 14; primary support members 17 may be positioned between the side members 16 and extend between the first member 12 and the second member 14 in a direction perpendicular to the first member 12 and second member 14; two secondary support members 20 may be spaced apart and extend between primary support members 17 in a direction parallel to the first member 12 and second member 14; and two tertiary support members 22 may be spaced apart and extend between the two secondary members 20 in a direction perpendicular to the secondary support members 20 and the first member 12 and second member 14. In addition, primary support members 17 can also extend between the secondary members 20 and the first member 12 and/or second member 14. As shown in FIG. 5, a secondary cavity 26 is formed between the secondary support members 20 and tertiary support members 22. The resulting rectangular or square wall panel can be used in a residential home or building. The shape and design of the foam wall structure 10 is not so limited and can assume any shape and design as desired.

In certain embodiments, additional support members and structural elements may also be used depending on the intended use of the foam wall structure 10. For example, and as shown in FIGS. 5 and 6, a header 28 may be used to provide additional support for a door or window. Other additional support members may be used for structural purposes, design purposes, and the like.

Figure 8B:
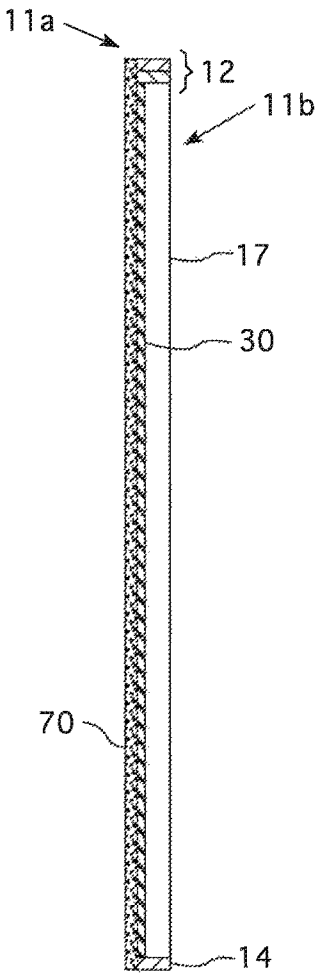
FIG. 8B is a side cross-sectional view of the foam wall structure of FIG. 4 according to one embodiment of the present invention.
Figure 8A:
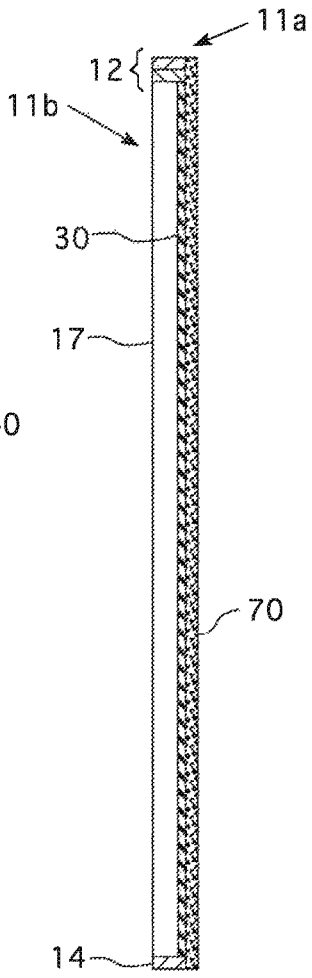
FIG. 8A is a side cross-sectional view of the foam wall structure of FIG. 4 according to one embodiment of the present invention.
Figure 7:
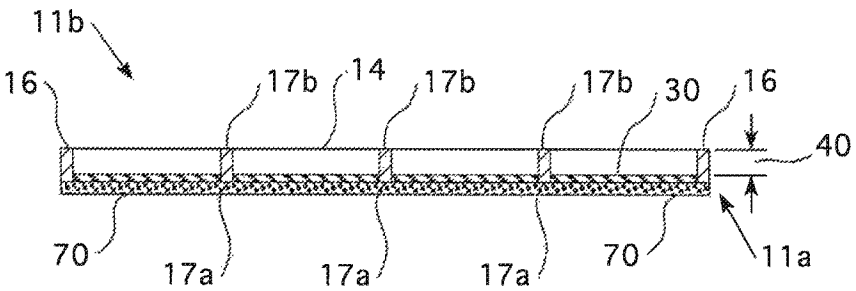
FIG. 7 is a top cross-sectional view of the foam wall structure of FIG. 4 according to one embodiment of the present invention.

Referring to FIGS. 7-8, a slab of polyiso board 70 is attached to at least a portion of the front frame surface. By "polyiso board" (or PIR) it is meant a sheet or slab or section of polyisocyanurate-modified polyurethane foam. Compared to polyurethane foams, polyiso foams have a much higher isocyanate content. Through the use of certain catalysts the isocyanate is able to react with itself forming a ring-like structure that is very stable in tire situations. Such polyiso boards typically have a thickness which varies depending on the application. In some embodiments, the polyiso board will have a thickness of about ½" to about 3", preferably about ¾" to about 2". The polyiso board may have a front face and a rear face.

The polyiso board may be attached to the front frame surface by various means. In one embodiment, the polyiso board is attached to the front frame surface by fasteners. The fasteners used to attach the polyiso board to the front frame surface are not necessarily the same as the fasteners used to engage the first and second members, as described above. Suitable fasteners may include nails, staples or screws, although if screws are used, care must be used so as not to damage the polyiso board.

In an alternate embodiment, the polyiso board is attached to the front frame surface by the use of one or more adhesives. The adhesives may be selected from latex-based adhesives, reactive hot melts, polyester adhesives, polyamide adhesives, acrylic adhesives, one-component epoxy-based adhesives, one-component polyurethane-based adhesives and two-component polyurethane-based adhesives. As described below, in one embodiment a foam material may be used as the adhesive. In this embodiment, a thin layer of foam may be applied to the polyiso board, the front frame surface, or both before adhering the polyiso board to the front frame surface.

Polyiso boards are generally produced with facers on both sides, which may be the same or different. For roofing foams these facers are typically glass mats filled with recycled cardboard and colored with carbon black. Wall foams typically use impermeable facers like foil or foil/glass composites. In one embodiment, the polyiso board may have a facer material (not shown in the Drawings) attached to at least a portion of the front face and/or the rear face. Preferably the facer material will cover the entire surface of at least one of the front face and the rear face. In one embodiment, the facer material will cover substantially the entire surface of both the front face and the rear face. The facer material is preferably a fibrous material which may help protect the front and/or rear surface of the polyiso board. The facer material may advantageously promote adhesion of the foam layer 30 to the polyiso board 70. Suitable materials for the facer material used in the present invention include fiberglass malts, foil and foil/glass composites, or polyolefin films (such as the commercially available TYYEK from DuPont or TYPAR available from Fiberweb, Inc.). As mentioned above, the facer material on the front face may be the same as or may be different than the facer material on the rear face.

In one embodiment the polyiso board 70 is produced in multiple sections which are joined together by tape or caulk or one-component polyurethane foam to form the polyiso board 70.

In certain embodiments, a foam material can be deposited into the frame 11. As used herein, the term "foam material" refers to a substance that is formed by trapping pockets of gas in a liquid or solid. In certain embodiments, the foam material is a closed-cell foam. As used herein, "closed-cell foam" refers to foam that contains discrete, non-interconnecting cells. Non-limiting examples of foam material that can be used with the present invention include materials made with polyurethane, polyisocyanurate (also referred to as polyiso), and mixtures thereof.

In some embodiments, the foam material may be substantially free, may be essentially free, and may be completely free of halogen containing flame retardant additives. The term "halogen" refers to the halogen elements, which include fluorine, chlorine, bromine and iodine, and the term "halogen containing flame retardant additives" refers to a substance that may be used to inhibit or resist the spread of fire and which contains halogen groups such as a fluoro, chloro, bromo and/or iodo group. Further, the term "substantially free" as used in this context means the foam material contains less than 1000 parts per million (ppm), "essentially free" means less than 100 ppm, and "completely free" means less than 20 parts per billion (ppb) of halogen containing flame retardant additives.

As shown in FIGS. 3-4 and 7-8, the foam material can be deposited into the frame 11 such that the foam material forms a foam layer 30 within at least a portion of the frame 11 between the front frame surface 11a and the rear frame surface 11b and adheres to the polyiso board 70.

Figure 10:
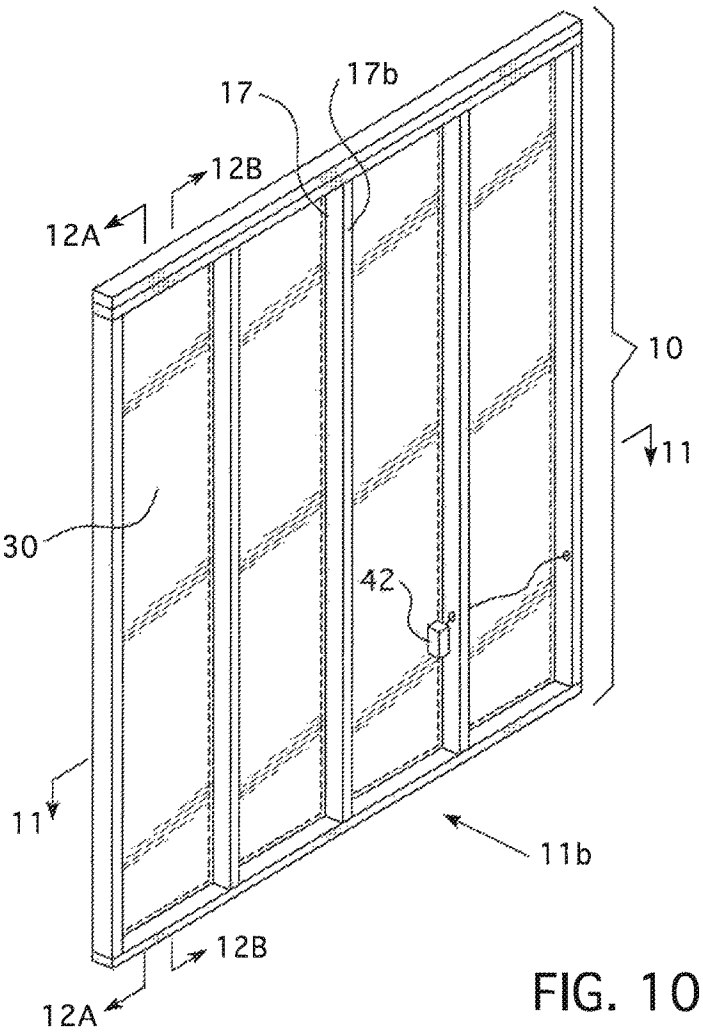
FIG. 10 is a rear perspective view of a foam wall structure of FIG. 9 according to one embodiment of the present invention.
Figure 9:
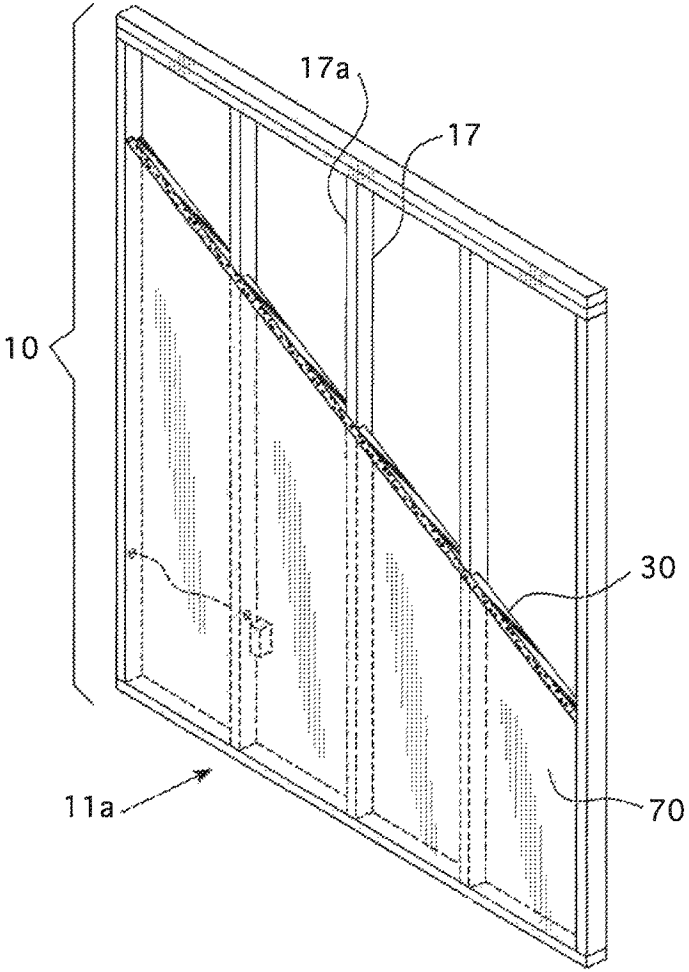
FIG. 9 is a front perspective view of a foam wall structure according to one embodiment of the present invention.
Figure 12B:
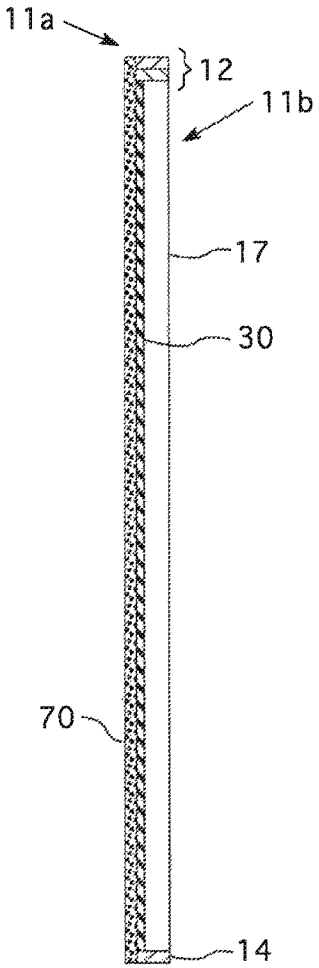
FIG. 12B is a side cross-sectional view of the foam wall structure of FIG. 9 according to one embodiment of the present invention.
Figure 12A:
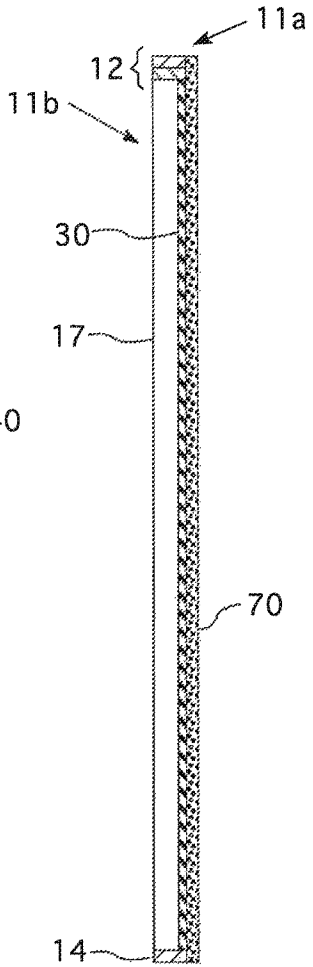
FIG. 12A is a side cross-sectional view of the foam wall structure of FIG. 9 according to one embodiment of the present invention.
Figure 11:
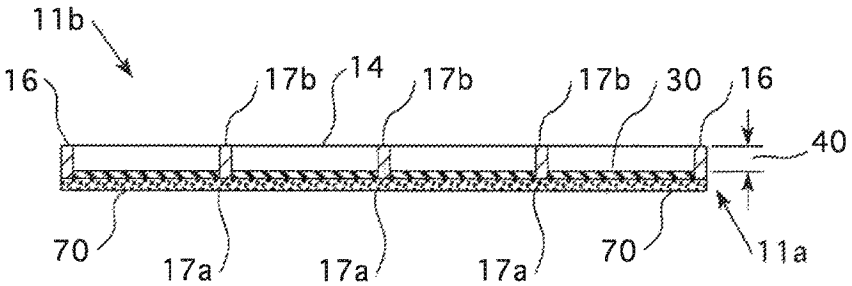
FIG. 11 is a top cross-sectional view of the foam wall structure of FIG. 9 according to one embodiment of the present invention.

Referring to FIGS. 7 and 11, the foam layer 30 can be dimensioned to expand to a position intermediate the front frame surface ha and rear frame surface 11b, thereby forming a gap or opening 40 within the foam wall structure 10 between the foam layer 30 and the rear frame surface 11b. FIGS. 4 and 10 further show that this gap 40 can be used as an area to incorporate home utility components 42 such as electrical wires, cords, heating and cooling pipes, and plumbing fixtures. These home utility components may be inserted into the gap 40 located between the foam layer 30 and the rear frame surface 11b such that utilities components are not surrounded or contacting the foam layer 30, in certain embodiments, the gap 40 comprises at least two inches as measured between the foam layer and the rear frame surface 14.

Figure 13:
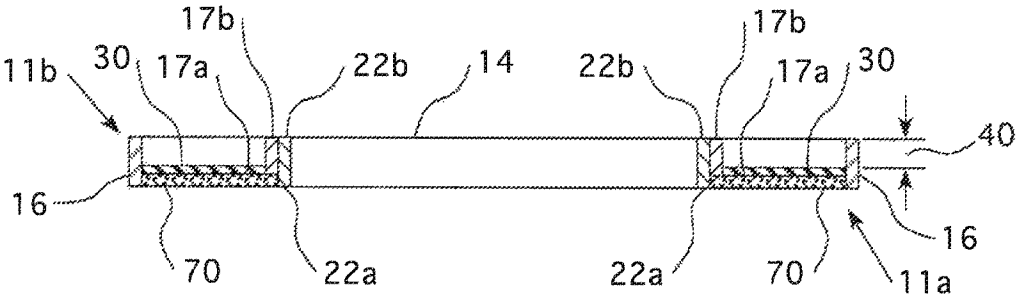
FIG. 13 is a top cross-sectional view of a foam wall structure according to one embodiment of the present invention.

In certain embodiments, when secondary support members 20 and/or tertiary support members 22 are used with the foam wall structure 10 to form a secondary cavity 26, the secondary cavity 26 can be free of foam. For example, in some embodiments, the foam layer 30 does not extend beyond and over the front secondary support surfaces 20a of the secondary members 20, the front tertiary support surfaces 22a of the tertiary support members 22, and/or beyond and over at least a portion of the front surfaces of other members that help form the secondary cavity 26. FIG. 13 shows a top cross-sectional view with the foam layer 30 not extending beyond the front tertiary support surface 22a of the tertiary members 22 according to one embodiment. In such cases, corresponding openings are preferably present in the polyiso board 70.

Further, the foam layer 30 can be formed in-situ during the manufacturing process. The term "formed in-situ during the manufacturing process" refers to the formation of a foam layer 30 as described herein during manufacturing of the foam wall structure 10 off-site at a facility remote or away from a building construction site. As such, the foam layer 30 may be formed not at a construction site as is required by conventional methods.

The foam layer is able to fill tight spaces and seal gaps that are not visible to the naked eye. The foam layer 30 also acts as a vapor and thermal insulating barrier, which reduces energy consumption in buildings and residential homes when the present invention is used as a wall panel. In addition, the foam layer 30 provides structural stability to the foam wall structure 10 such as improved wall racking strength. As used herein, wall racking strength refers to the ability of a wall structure to maintain its shape under duress.

Figure 18A:
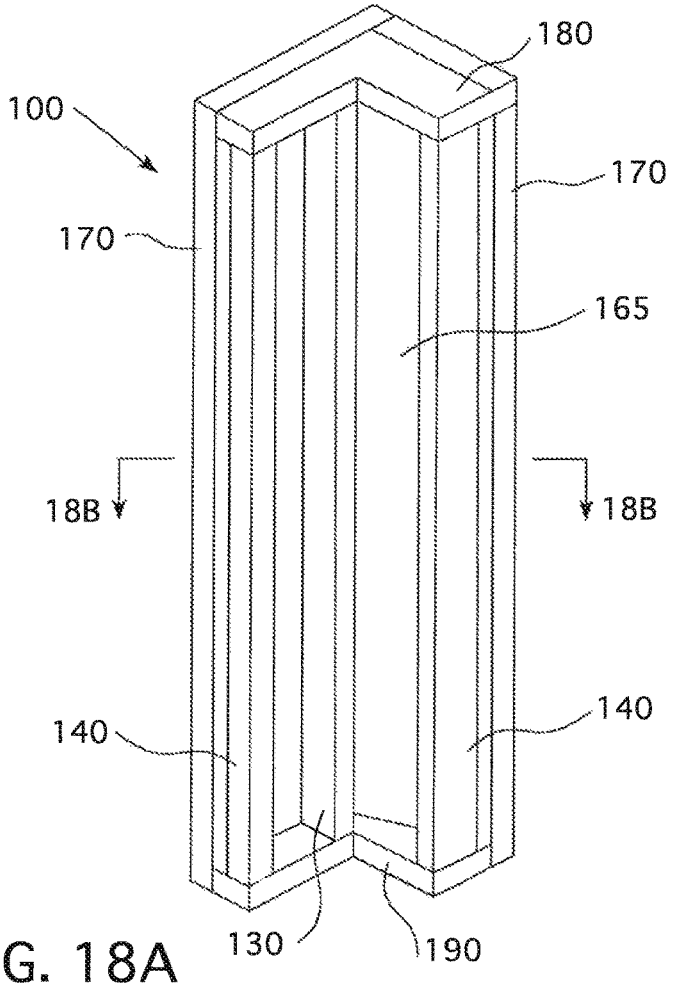
FIG. 18A is a front perspective view of a corner piece according to one embodiment of the present invention.
Figure 18B:
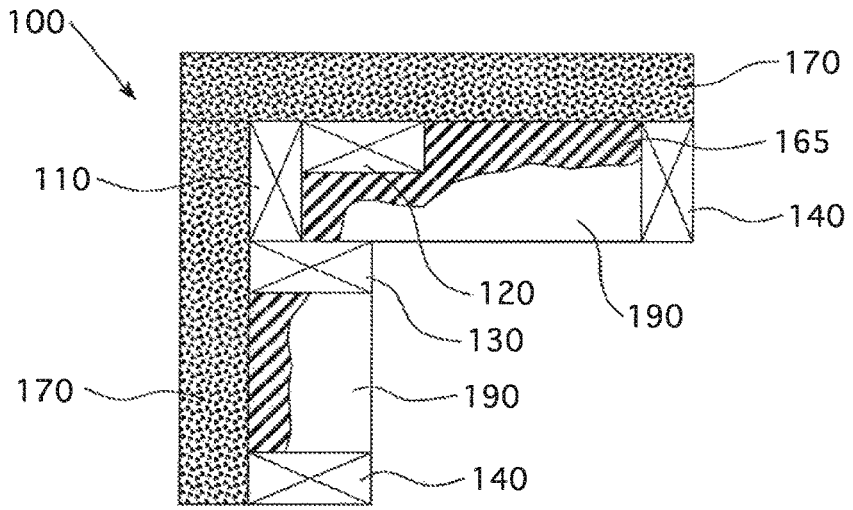
FIG. 18B is a cross-sectional view of a corner piece taken along line 18B-18B according to one embodiment of the present invention.

The present invention also includes corner pieces as illustrated in FIGS. 18A, 18B, 19A, 19B, 20A, 20B, 21A and 21B. The corner pieces facilitate the joining of two or more foam wall structures to define a room or a portion of a room. Reference is made to FIGS. 18A and 18B illustrating one embodiment of corner piece 100, wherein the corner piece is intended for use as an exterior corner (i.e., the "corner" points out in a direction away from the interior of the room).

The corner piece 100 comprises top member 180 and bottom member 190 which may be unitary members formed from a single piece of material, or formed by fastening two separate members together at the desired angle.

The corner piece 100 further comprises two or more corner support members 110 and 120 extending between, and attached to, top member 180 and bottom member 190. Corner support members 110 and 120 are fastened together at preferably a right angle, to form a generally L-shaped piece. The angle at which the corner support members are joined will define the interior angle of the corner piece. As will be appreciated by those skilled in the art, a right angle is preferable, although other angles, both greater than or less than 90 degrees may be utilized, depending on the desired angle of the corner piece. If an angle other than 90 degrees is desired, the corner support members 110 and 120 may be joined together using a combination of fasteners and wedges. In this embodiment, corner support member 130 may also extend between, and attached to, top member 180 and bottom member 190, and attached to corner support members 110 and 120.

The corner piece 100 further comprises two corner support members 140 located at the terminal ends of the corner piece 100, and extending between, and attached to, top member 180 and bottom member 190. The corner support members 110, 120, 130 and 140, along with top member 180 and bottom member 190 are oriented so as to form an exterior face of the corner piece 100. In one embodiment, one or more slabs of polyiso board 170 are attached to the exterior face of the corner piece 100, as shown in FIGS. 18A and 18B. Preferably, polyiso board 170 covers substantially all of the exterior face of the corner piece 100.

The corner piece 100 may preferably be attached to one or more foam wall structures 10 (wall structure 10 as illustrated in FIGS. 3-12). In one embodiment, the corner support members 140 are aligned with and attached to the side members 16 of the wall structure 10.

In the embodiment illustrated in FIG. 18A and FIG. 18B, the corner support members 110, 120, 130 and 140, along with top member 180, bottom member 190 and the polyiso board 170 define at least one cavity in the interior portion of the corner piece 100. In some embodiments, a foam material can be deposited into the cavity of the corner piece 100 such that the foam material forms a foam layer 165 within at least a portion of the corner piece 100 adheres to the polyiso board 170 and to the support members 110, 120, 130 and 140.

It is noted in this embodiment, corner support members 140 are oriented such that the polyiso board 170 covers substantially all of at least one side of corner support member 140 in such a way that any exterior attachments such as siding or cladding) are made directly to the polyiso board 170 (with such attachments extending through the polyiso board 170 to one or more of the corner support members 110, 120, 130 and 140), and substantially no portion of corner support members 140 are exposed to the exterior face of corner piece 100.

Figure 20A:
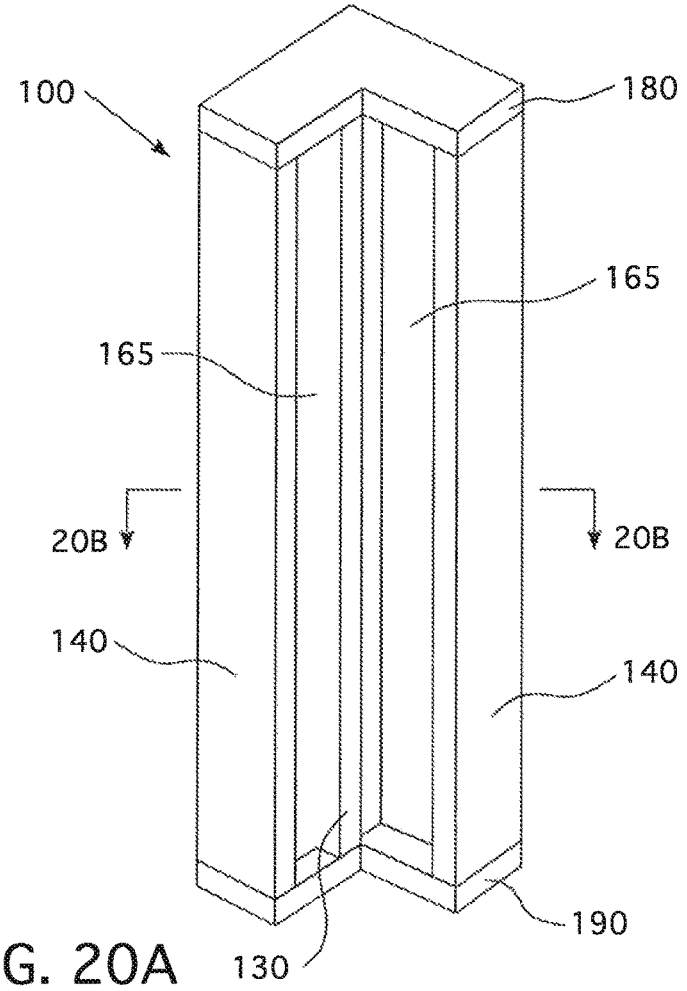
FIG. 20A is a front perspective view of a corner piece according to one embodiment of the present invention.
Figure 20B:
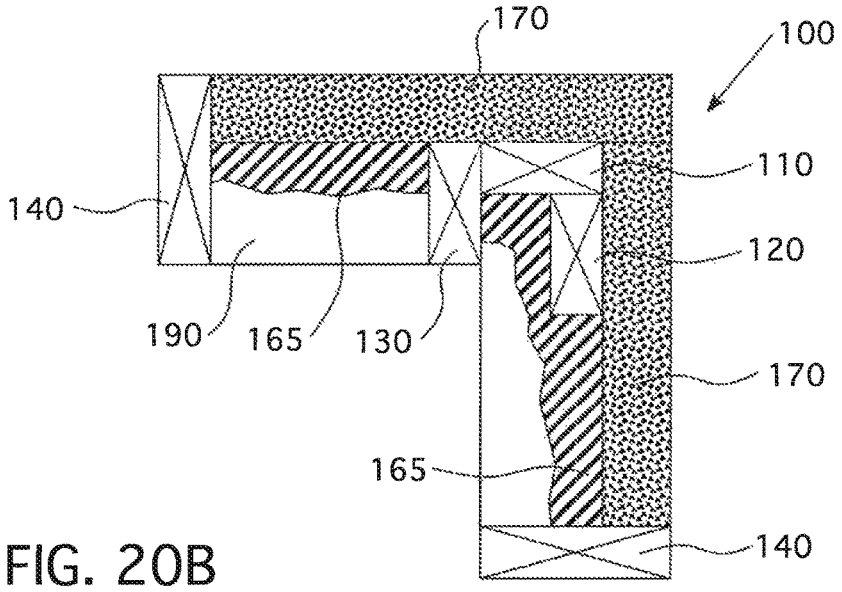
FIG. 20B is a cross-sectional view of a corner piece taken along line 20B-18B according to one embodiment of the present invention.

FIGS. 20A and 20B illustrate a further embodiment of the corner piece 100. In this embodiment, the various components described in the embodiment illustrated in FIGS. 18A and 18B are used and oriented in the same fashion. However, in the embodiment illustrated in FIGS. 20A and 20B, corner support members 140 are oriented such that the polyiso board 170 only covers a portion of at least one side of corner support member 140 in such a way that any exterior attachments (such as siding or cladding) may be made directly to the polyiso board 170 and directly to corner support member 140 (with such attachments extending through the polyiso board 170 to one or more of the corner support members 110, 120, and 130).

Figure 19A:
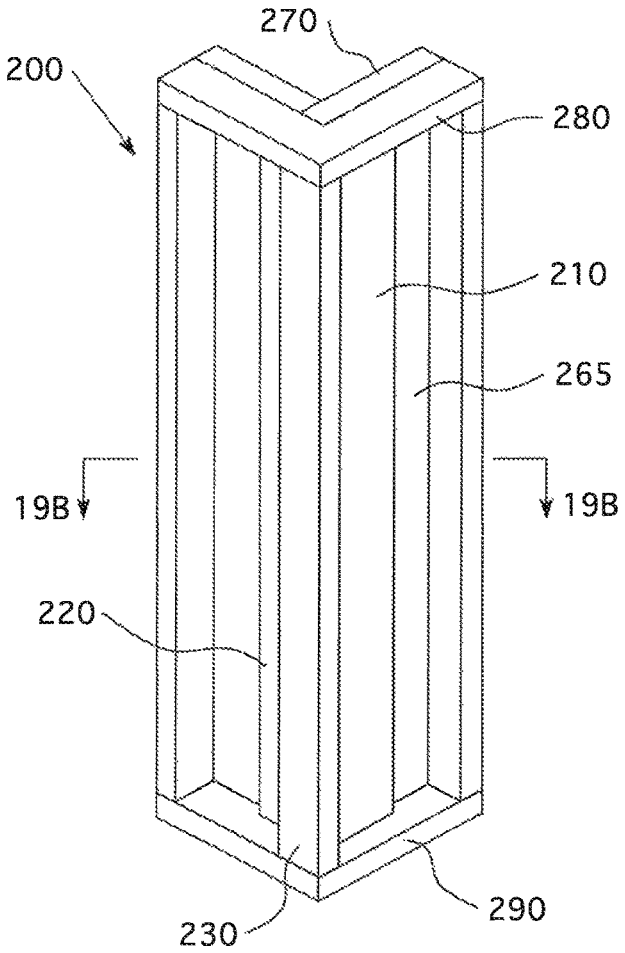
FIG. 19A is a front perspective view of a corner piece according to one embodiment of the present invention.
Figure 19B:
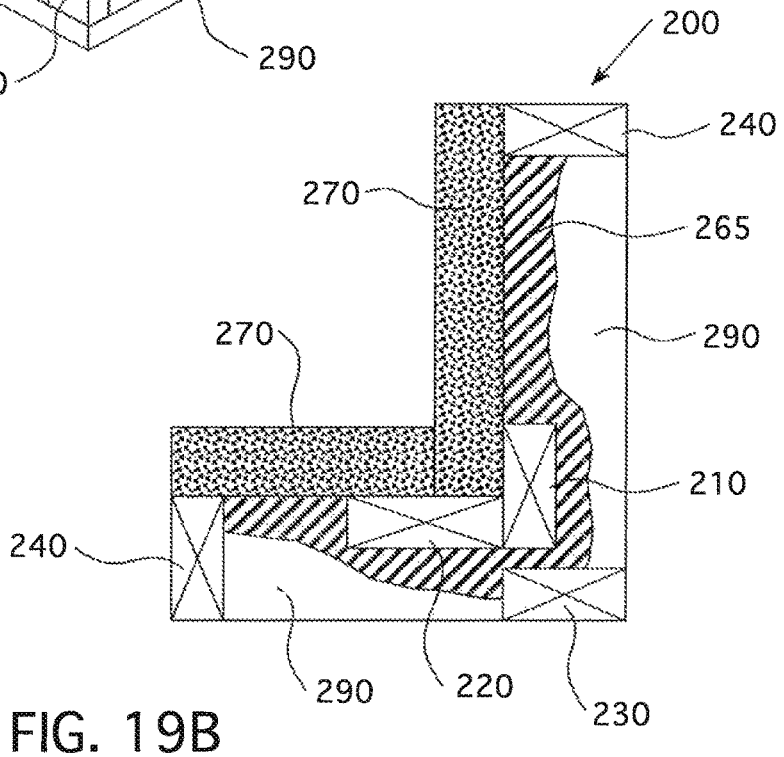
FIG. 19B is a cross-sectional view of a corner piece taken along line 19B-18B according to one embodiment of the present invention.

An alternate embodiment of the corner piece is illustrated in FIGS. 19A and 19B, wherein the corner piece is intended for use as an interior corner (i.e., the "corner" points in a direction towards the interior of the room).

The corner piece 200 comprises top member 280 and bottom member 290 which may be unitary members formed from a single piece of material, or formed by fastening two separate members together at the desired angle.

The corner piece 200 further comprises two or more corner support members 210 and 220 extending between, and attached to, top member 280 and bottom member 290. Corner support members 210 and 220 are fastened together at preferably a right angle, to form a generally L-shaped piece. The angle at which the corner support members are joined will define the interior angle of the corner piece. As will be appreciated by those skilled in the art, a right angle is preferable, although other angles, both greater than or less than 90 degrees may be utilized, depending on the desired angle of the corner piece. If an angle other than 90 degrees is desired, the corner support members 210 and 220 may be joined together using a combination of fasteners and wedges. In this embodiment, corner support member 230 may also extend between, and attached to, top member 280 and bottom member 290, but not attached to corner support members 210 and 220.

The corner piece 200 further comprises two corner support members 240 located at the terminal ends of the corner piece 200, and extending between, and attached to, top member 280 and bottom member 290. The corner support members 210, 220 and 240, along with top member 280 and bottom member 290 are oriented so as to form an exterior face of the corner piece 200. In one embodiment, one or more slabs of polyiso board 270 are attached to the exterior face of the corner piece 200, as shown in FIGS. 19A and 19B. Preferably, polyiso board 270 covers substantially all of the exterior face of the corner piece 200.

In the embodiment illustrated in FIG. 19A and FIG. 19B, the corner support members 210, 220, 230 and 240, along with top member 280, bottom member 290 and the polyiso board 270 define at least one cavity in the interior portion of the corner piece 200. In some embodiments, a foam material can be deposited into the cavity of the corner piece 200 such that the foam material forms a foam layer 265 within at least a portion of the corner piece 200 adheres to the polyiso board 270 and to the support members 210, 220, 230 and 240.

It is noted in this embodiment, corner support members 240 are oriented such that the polyiso board 270 covers substantially all of at least one side of corner support member 240 in such a way that any exterior attachments (such as siding or cladding) are made directly to the polyiso board 270, and substantially no portion of corner support members 240 are exposed to the exterior face of corner piece 200.

Figure 21A:
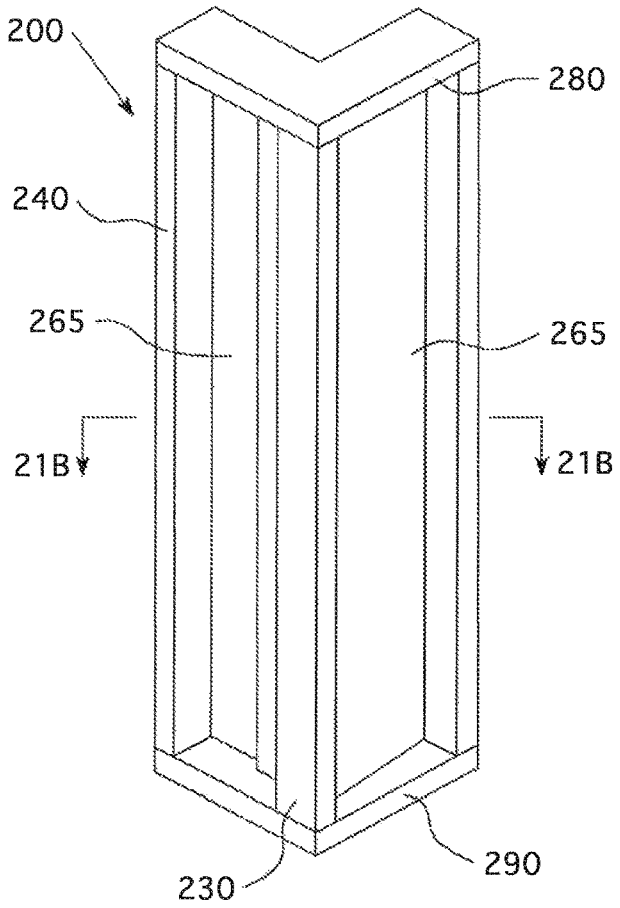
FIG. 21A is a front perspective view of a corner piece according to one embodiment of the present invention.
Figure 21B:
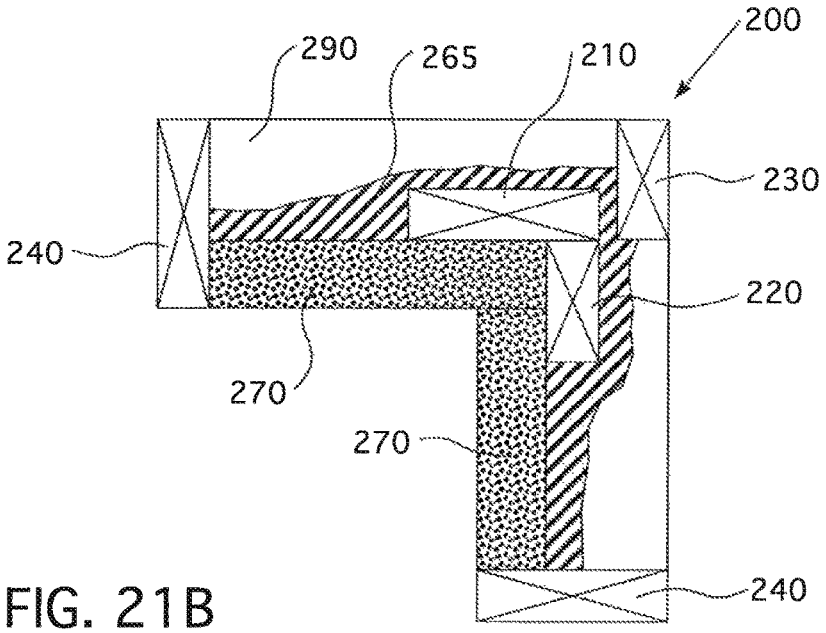
FIG. 21B is a cross-sectional view of a corner piece taken along line 21B-18B according to one embodiment of the present invention.

FIGS. 21A and 21B illustrate a further embodiment of the corner piece 200. In this embodiment, the various components described in the embodiment illustrated in FIGS. 19A and 19B are used and oriented in the same fashion. However, in the embodiment illustrated in FIGS. 21A and 21B, corner support members 240 are oriented such that the polyiso board 270 only covers a portion of at least one side of corner support member 240 in such a way that any exterior attachments (such as siding or cladding) may be made directly to the polyiso board 270 and to corner support member 240 (with such attachments extending through the polyiso board 270 to one or more of the corner support members 210, 220, and 230).

The corner piece 200 may preferably be attached to one or more foam wall structures 10. In one embodiment, the corner support members 240 arc aligned with and attached to the side members 16 of the wall structure 10 (wall structure 10 as illustrated in FIGS. 3-12).

The present invention is also directed to methods of making a foam wall structure 10. In certain embodiments, a method of making a foam wall structure 10 includes first constructing a frame 11 having at least one primary support member 17. The frame 11 having at least one primary support member 17 can be constructed in accordance with any of the embodiments disclosed herein. Referring to FIGS. 14-17, after constructing the frame 11 with at least one primary support member 17, the front frame surface 17a can be orientated over a rigid surface 50 such that the front frame surface 11a is positioned parallel or at least substantially parallel to the rigid surface 50 A "rigid surface" refers to any surface that is capable of receiving the frame 11 without bending, flexing, or moving. In certain embodiments, and as shown in FIGS. 14-17, the rigid surface 50 has a width equal to or greater than the width of the front frame surface 11a and a length equal to or greater than the length of the front frame surface 11a. In one non-limiting example, the rigid surface 50 is substantially horizontal.

After orientating the front frame surface 17a over the rigid surface 50, a foam material can be deposited into the frame 11. The foam material may be deposited into the frame 11 with an automated delivery device. Alternatively, the foam may be deposited into the frame 11 using various other devices including, but not limited to, a foam dispensing gun that is controlled and carried by an individual user. In one embodiment, as shown in FIGS. 14-17, the foam material is deposited into the frame 11 with an automated foam dispensing rig 60 that can be calibrated to dispense a predetermined amount of foam. The foam dispensing rig 60 can include one or more nozzles 62. The nozzles 62 can be positioned over the frame 11 of the foam wall structure 10 so that each nozzle 62 sprays or pours foam into cavities 18 located within the frame 11 such as the cavities 18 shown in FIG. 3. A foam dispensing rig 60 with a plurality of nozzles 62 makes it possible to dispense foam quickly and efficiently. In certain embodiments, the nozzles 62 can move into different positions.

Figure 14:
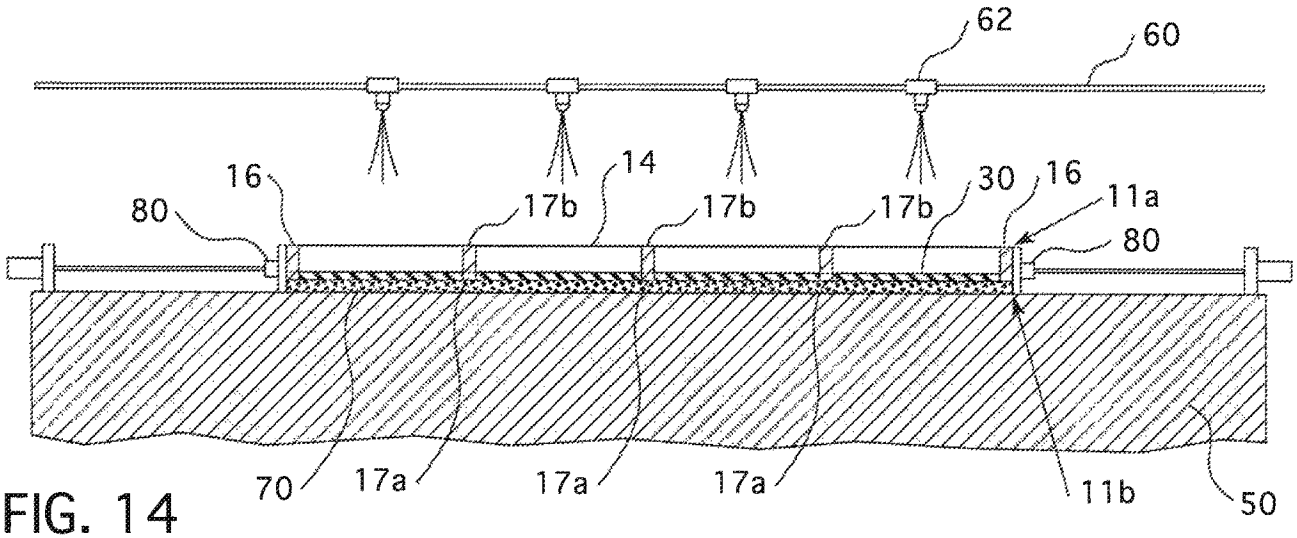
FIG. 14 is a top cross-sectional view of foam material being deposited into a frame according to one embodiment of the present invention.

Referring to FIGS. 14-17, in certain embodiments, the foam material may be deposited into the frame 11 so that the foam material contacts the rigid surface 50. As shown in FIG. 14, the material may be deposited so that a foam layer 30 extends beyond the front primary support surfaces 17a and the front frame surface 11a.

Figure 16:
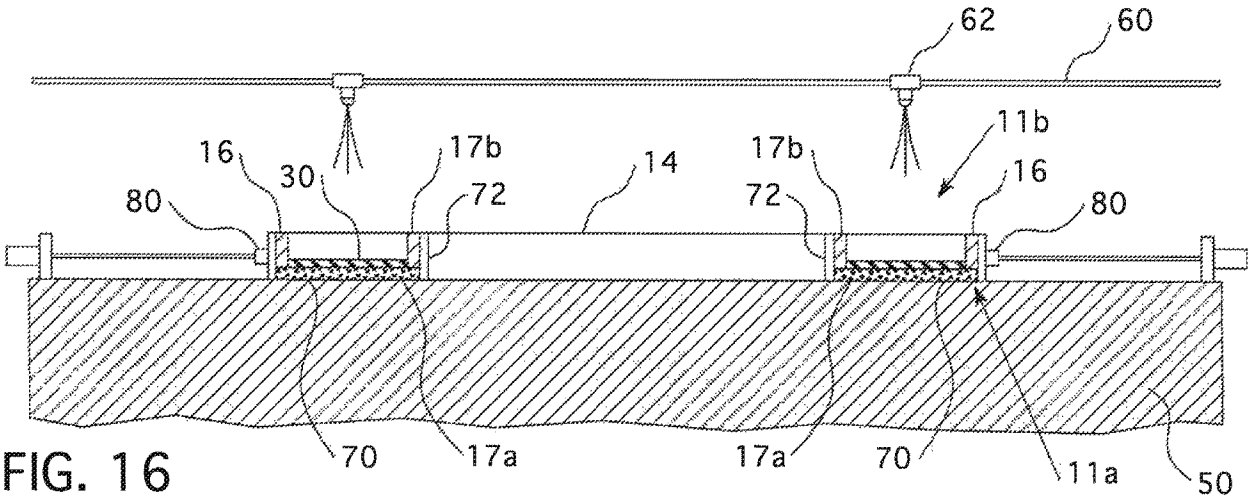
FIG. 16 is a top cross-sectional view of foam material being deposited into a frame according to one embodiment of the present invention.

Referring to FIG. 16, in certain embodiments, the foam material is deposited into the frame 11 so that the foam layer 30 does not extend beyond the front frame surface 11a. Accordingly, in some embodiments, the foam material is deposited into the frame 11 so that a foam layer 30 forms and is flush or contained between the front frame surface 11a and rear frame surface 11b.

Figure 15:
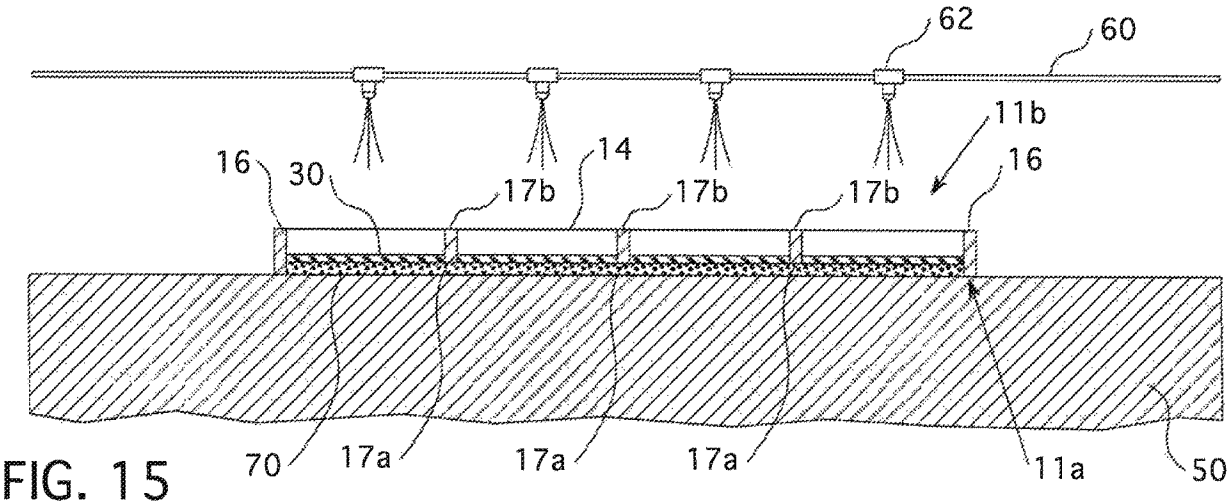
FIG. 15 is a top cross-sectional view of foam material being deposited into a frame according to one embodiment of the present invention.

As shown in FIGS. 15-16, the foam material can be deposited into the frame 11 so that the foam layer 30 can expand to a position intermediate the front frame surface 11k and rear frame surface 11b. A gap or opening 40 can therefore be formed between the foam layer 30 and the rear frame surface 11b to incorporate home utility components 42 such as electrical wires, cords, heating and cooling pipes, and plumbing fixtures, as can be seen in FIGS. 4 and 10. As shown in FIG. 16, a second form 72 may be positioned between adjacent primary support members 17 to prevent foam material 30 from expanding into undesired areas. A form 80 may be placed around the perimeter of the frame 11 help hold the frame while the foam 30 is deposited inside the frame 11.

As shown in FIG. 15, in another non-limiting embodiment, the front frame surface 11a can be placed onto the rigid surface 50 without elevating the frame 11. As shown in FIG. 15, foam material can be deposited into the frame 11 such that a foam layer 30 is formed extending over the front primary support surfaces 17a and not the front frame surface 11a. As such, the foam layer 30 forms over the front primary support surfaces 17a and is flush or contained between the front and rear frame surface 11a, 11b.

Figure 17:
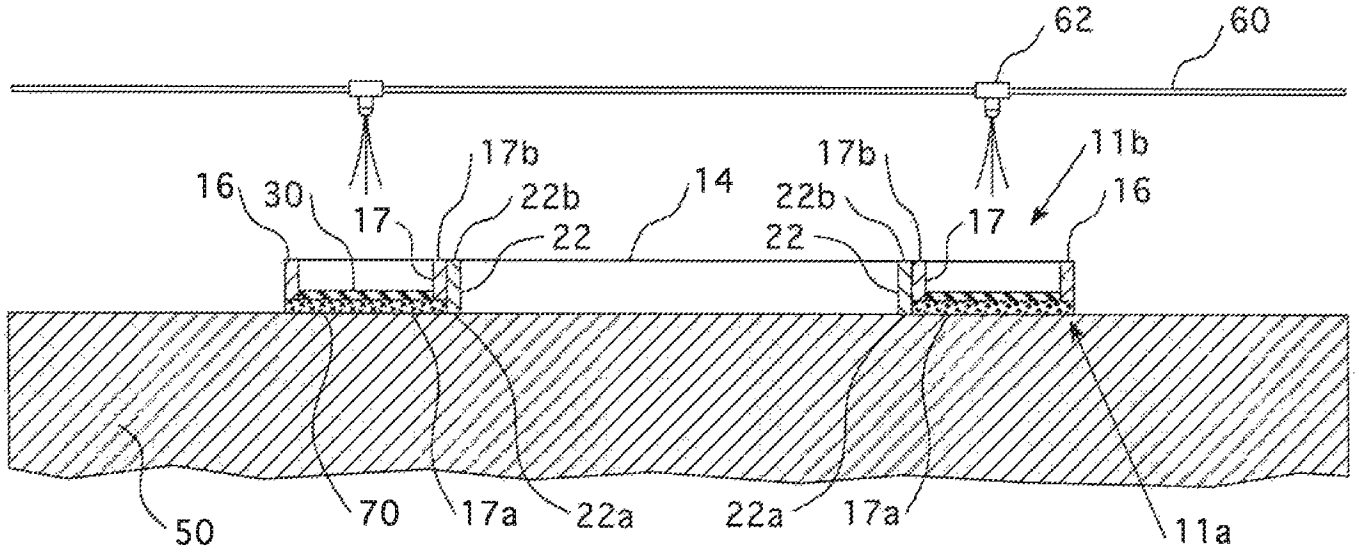
FIG. 17 is a top cross-sectional view of foam material being deposited into a frame according to one embodiment of the present invention.

As indicated, the foam wall structure 10 can also include secondary support members 20 and tertiary support members 22 that form a secondary cavity 26 within the frame 11. Accordingly, in certain embodiments, the methods described herein include constructing a frame 11 having one or more secondary support members 20 and tertiary support members 22. In certain embodiments, to prevent foam material from entering the secondary cavity 26, the dimensions of the secondary support members 20 and/or tertiary support members 22 have a greater height than the primary support members 17. FIG. 17 shows a top cross-sectional view of the process of depositing foam into a frame 11 with tertiary support members 22 having a greater height than the primary support members 17.

After the foam layer 30 has expanded, the formed foam wall structure 10 can be removed from the rigid surface 50 and shipped directly to a job site for use as a wall panel. Accordingly, the present invention is also directed to a pre-fabricated wall panel prepared according to the methods described herein. The foam wall structure 10 can be installed without any additional steps, thereby reducing the number of sub-contractors necessary to complete the installation of a wall at a construction site. In addition, the foam wall structure 10 does not require additional materials such as sheathing, OSB boards, and house wrap that are typically used in current residential building practices. Therefore, installation costs would decrease. The present invention would also decrease the overall cost per square foot per R-value.

One advantage of the present invention is that while additional materials such as OSB boards are not necessary, they may optionally be used, if desired. For example, OSB boards or plywood may be attached to the front face of the polyiso board 70. In such an embodiment, the additional materials may assist in cladding attachment to the exterior of the foam wall structure 10. In the absence of OSB boards or plywood, the facer material on the front face of the polyiso board is preferably one that provides a weather-resistant barrier. Such material is preferably a traditional foil or foil/glass composite material. The facer material over the polyurethane or polyiso board should meet the requirements as described in ASTM D226 (Standard Specification for Asphalt-Saturated Organic Felt Used in Roofing and Waterproofing) or ASTM E2556 (Standard Specification for Vapor Permeable Flexible Sheet Water-Resistive Barriers Intended for Mechanical Attachment), or otherwise qualify as a water-resistive barrier in accordance with IRC 703.2.

The foam wall structure 10 also imparts a higher wall racking strength and improves thermal performance in comparison to existing wall solutions through the introduction of a foam layer 30 with the uninterrupted foam surface 31. Further, the foam wall structure 10 will help meet future R-value industry standards that are expected to increase in certain regions, while still utilizing current wall designs. With current fiberglass insulation, builders would have to convert 2×4-based wall designs to 2×6-based wall designs to ensure enough wall cavity capacity for additional insulation to meet such higher standards.

The methods described herein also improve the consistency of installing insulation, and make it easy to install electrical and plumbing components in the gap or opening 40 of a wall panel. The present invention would also decrease the overall cost per square foot per R-value.

The foam wall structure 10 is not limited for use in newly constructed homes and can be used for residential exterior insulation retrofit applications. Accordingly, another aspect of the present invention is the replacement of wall panels in older homes and buildings with the foam wall structure 10 described herein.

EXAMPLES

A study was conducted by the National Association of Home Builders (NAHB) Research Foundation with the objective of determining performance criteria for racking resistance. Testing was done in accordance with ASTM E-72. The Research Foundation made a series of recommendations/criteria for the acceptability of exterior wall configurations that can resist racking load. Walls are required to achieve the greater of an ultimate load of 3600 lbs., or three times the design wind load.

The walls described in the following examples use this pass/fail criteria.

Example 1

Wall Design According to the Present Invention

Two inches of polyiso board as the continuous insulation on the outer side of the stud wall.

A wall structure according to the present invention was constructed by positioning two 2×4 dimensional lumber studs between a double 2×4 dimensional lumber top plate and a single 2×4 dimensional lumber bottom plate and spaced apart 24 inches from center. The 2×4 dimensional lumber is 1.5 inches thick and 3.5 inches wide. The studs were fastened to both the top plate and the bottom plate by using 16d nails which are about 3 inches long in accordance with ASTM E-72 requirements. A sheet of exterior sheathing, 2 inch thick, Type II Class 2 polyiso board according to ASTM C-1289 was attached to the wall frame so as to cover the stud cavity on one side of the wall frame. The polyiso board was attached to the wall frame with 6, 2-inch long screws compliant with ICC AC05.

Polyurethane foam (Bayseal© CC available from Bayer MaterialScience LLC, Pittsburgh, Pa.) was sprayed into the stud cavity to an expanded thickness of about 1 inch leaving about 2.5 inches of space for electrical or plumbing modifications. A "picture frame" layer of spray foam was as the first foam layer in contact with the wall studs and the top and bottom plates.

The wall structure was tested according to ASTM E-72-05 Standard Test Methods of Conducting Strength Tests of Panels for Building Construction Section 14, Racking Load—Evaluation of Sheathing Materials on a Standard Wood Frame. The test method measures resistance of panels to a racking load such as would be imposed by winds blowing on a wall oriented at 90° to the panel.

The wall structure was loaded and then unloaded to 790 lbf, 1,570 lbf and 2,360 lbf and then loaded to failure (recorded as Ultimate Load). The deflection at 790 lbf was 0.016 inches, at 1,570 lbf was 0.041 inches and at 2360 lbf was 0.061 inches. The Ultimate Load was 5100 lbf. The wall structure met the criteria set by the National Association of Home Builders (NAHB). This example illustrates a wall structure of the present invention that can support remarkably high loads.

The performance of the wall structure would only improve with the inclusion of interior sheathing. The surprising result of the strength of this wall is independent of the type of interior sheathing that might be included.

Example 2

High Performance Well Made with Huber's Zip System R-Sheathing

A wall structure as described in Example 1 was constructed, except the external continuous insulation layer was Huber's Zip System R-Sheathing with 1 inch of polyiso bonded to the oriented strand board. The insulation boards were fastened to the frame with 16d nails, spacing them at 3 inches around the edges and 6 inches in the field. The cavity formed by the framing and the R-Sheathing was sprayed with a polyurethane foam to a thickness of about 1 inch. The sprayed polyurethane foam in the stud wall cavities acts as sealant, adhesive and insulation.

The weather resistive barrier coating which is included as part of Huber's Zip System R-Sheathing on the exterior surface of the OSB provides an additional layer of protection from water infiltration and damage.

The wall structure was tested according to ASTM Test Method E-72-05, Section 14. The wall structure was loaded and then unloaded to 790 lbf, 1,570 lbf and 2,360 lbf and then loaded to failure (recorded as Ultimate Load). The deflection at 790 lbf was 0.19 inches, at 1,570 lbf was 0.436 inches and at 2360 lbf was 0.738 inches. The Ultimate Load was 4500 lbf. The racking performance of this structure easily net the NAHB requirements.

Example 3

OSB (Comparative)

A wall structure as described in Example 1 was constructed, except the structure was sheathed with 7/16 inch thick oriented strand board in place of the polyiso insulation boards. No insulation was applied to the stud wall cavities and nothing was used to cover the interior wall structure.

The example wall structure was loaded and then unloaded to 790 lbf, 1,570 lbf and 2,360 lbf and then loaded to failure (recorded as Ultimate Load). The deflection at 790 lbf was 0.022 inches, at 1,570 lbf was 0.115 inches and at 2360 lbf was 0.232 inches. The Ultimate Load was 5000 lbf. The wall structure meets the criteria set by the National Association of Home Builders (NAHB).

The next two walls include novel corner configurations.

Example 4

EPS

The wall structure described in Example 1 was constructed except with the polyiso board replaced by Expanded Polystyrene (EPS) insulation boards.

The wall structure was tested according to ASTM Test Method E-72-05 Section 14. The results were unacceptable. The Ultimate Load required by the NAHB Research Study was not met by the Expanded Polystyrene wall.

Example 5

XPS

The wall structure described in Example 1 was constructed except with the polyiso board replaced by Extruded Polystyrene insulation boards.

The wall structure was tested according to ASTM Test Method E-72-05 Section 14. The results were unacceptable. The Ultimate Load required by the NAM Research Study was not met by the Extruded Polystyrene wall.

Example 6

Mineral Wool as the Exterior Continuous Insulation

The wall structure described in Example 1 was constructed except with the Mineral Wool board insulation. Polyurethane foam (Bayseal© CC available from Bayer MaterialScience LLC, Pittsburgh, Pa.) was sprayed into the stud cavity to an expanded thickness of about 1 inch leaving about 2.5 inches of space for electrical or plumbing modifications. A "picture frame" layer of spray foam was applied as the first spray foam should be in contact with the wall studs and the top and bottom plates.

The wall structure was tested according to ASTM Test Method E-72-05 Section 14. The results were unacceptable according to the requirements of the NAHB study reported in Example 1.

The next two examples test foil-faced polyiso board products for comparison to the foam products made with coated glass facers. The foil facer used in example 7 is also embossed to add strength, which also provides a good surface for application of sprayed polyurethane foam. The facer used on the polyiso in example 8 is smooth, which negatively affects spray foam adhesion.

Example 7

Thermax

The wall structure described in Example 1 was constructed except the ASTM C-1289 Type II, Class 2 polyiso board was replaced by Thermax insulation boards (ASTM C-1289 Type I, Class 2).

The wall structure was tested according to ASTM Test Method E-72-05 Section 14. The ASTM E-72 Racking Strength results were very good. The structure passed the NAHB requirements.

Example 8

Tuff-R (Comparative)

The wall structure described in Example 1 was constructed except the polyiso board was replaced by Tuff-R insulation boards.

The wall structure was tested according to ASTM Test Method E-72-05 Section 14. This wall failed the test according to the NAHB requirements.

Example 9

Mending Plates

A wall structure described in Example 1 is built using mending plates instead of fasteners. Mending plates are typically used in the construction of roof trusses because of the superior speed of assembly compared to nails or screws.

Polyurethane foam (Bayseal© CC available from Bayer MaterialScience LLC, Pittsburgh, Pa.) was sprayed into the stud cavity to an expanded thickness of about 1 inch leaving about 2.5 inches of space for electrical or plumbing modifications. A "picture frame" layer of spray foam was applied as the first spray foam should be in contact with the wall studs and the top and bottom plates.

The wall structure was tested according to ASTM Test Method E-72-05 Section 14. The results were unacceptable according to the requirements of the NAHB study reported in Example 1.

Example 10

Inset Foam

This wall assembly has enhanced durability because the edges of the foam insulation boards are protected by the 2×6 frame around the 2×4 studs.

A wall structure according to the present invention was constructed by positioning two 2×4 dimensional lumber studs between a double 2×4 dimensional lumber top plate and a single 2×4 dimensional lumber bottom plate and spaced apart 24 inches from center. The 2×4 dimensional lumber is 1.5 inches thick and 3.5 inches wide. The studs were fastened to both the top plate and the bottom plate by using nails as described in ASTM Test Method E-72. A frame was built around the 2×4 wall with 2×6 dimensional lumber. A sheet of exterior sheathing, 2 inch thick. Type II Class 2 polyiso board according to ASTM C-1289 was attached to the wall frame so as to cover the stud cavity on one side of the wall frame and so the surface of the foam board was flush with the outer edge of the 2×6 framing. The polyiso board was attached to the wall frame with 6, 2-inch long, 16d nails compliant with ICC AC05.

Polyurethane foam (Bayseal© CC available from Bayer MaterialScience LLC, Pittsburgh, Pa.) was sprayed into the stud cavity to an expanded thickness of about 1 inch leaving about 2.5 inches of spacing contact with the wall studs and the top and bottom plates.

The wall structure was tested according to ASTM Test Method E-72-05 Section 14. The results were acceptable.

The performance of the wall structures would only improve with the inclusion of interior sheathing. The surprising result of the strength of the walls is independent of the type of interior sheathing that might be included.

While several embodiments of the invention were described in the foregoing detailed description, those skilled in the art may make modifications and alterations to these embodiments without departing from the scope and spirit of the invention. Accordingly, the foregoing description is intended to be illustrative rather than restrictive.

What is claimed is:

1. A foam wall structure comprising:

a) a frame comprising:

a first member;

a second member spaced apart from the first member; and two side members extending between the first and second members, wherein the first member, second member, and two side members each have a front surface and a rear surface that form the front frame surface and the rear frame surface of the frame;

b) at least one primary support member positioned between the two side members and extending between the first and second [member] *members*, wherein the primary support member defines a front primary support surface and an opposite rear primary support surface corresponding to the front frame surface and rear frame surface;

c) foam insulation positioned over the front frame surface, the foam insulation positioned over the front frame surface consisting of Type II, Class 2 polyiso board according to ASTM C-1289 that is attached to and in contact with [one of] at least a portion of the front frame surface [or at least a portion of the front primary support surface], such that the polyiso board, the first and second members, the two side members and the at least one primary support members define one or more voids within the frame; and d) a foam layer received within at least a portion of one of the voids within the frame, wherein the foam layer adheres to at least a portion of the polyiso board, wherein the foam layer is dimensioned to a position intermediate the front frame surface and rear frame surface such that a gap is formed within the frame between the foam layer and the rear frame surface, [and]

*wherein the foam wall structure has an ultimate load of ≥3,600 lbf when tested according to ASTM E72-05 in the absence of OSB and plywood, and* wherein the polyiso board has a thickness of about ½" to about 3".

2. The foam wall structure of claim 1, wherein the foam layer does not overlie the front frame surface.

3. The foam wall structure of claim 1, wherein the foam layer overlies at least a portion of the front frame surface.

4. The foam wall structure of claim 1, wherein the polyiso board is attached to [the] at least a portion of the front [face] *surface* of the first and second members and the two side members by fasteners.

5. The foam wall structure of claim 4, wherein the fasteners are selected from the group consisting of nails, staples and screws.

6. The foam wall structure of claim 1, wherein the polyiso board is attached to at least a portion of the front [face] *surface* of the first and second members and the two side members by one or more adhesives.

7. The foam wall structure of claim 6, wherein the adhesive is a thin portion of the foam layer.

8. The foam wall structure of claim 6, wherein the adhesive is a second foam layer.

9. The foam wall structure of claim 1, wherein the first member comprises two plates.

10. The foam wall structure of claim 1, wherein the frame further comprises one or more secondary support members extending between two adjacent primary support members or a primary support member and a side member such that a secondary opening is formed within the frame.

11. The foam wall structure of claim 10, wherein the secondary opening is free of foam, and a corresponding opening is present in the polyiso board.

12. The foam wall structure of claim 10, wherein the frame further comprises one or more tertiary support members extending between two secondary support members, or between a secondary support member and the first member or the second member.

13. The foam wall structure of claim 1, wherein the foam layer is formed in-situ during the manufacturing process.

14. The foam wall structure of claim 1, wherein the foam layer comprises polyurethane, polyisocyanurate, or mixtures thereof.

15. The foam wall structure of claim 14, wherein the foam layer is substantially free of halogen containing flame retardant additives.

16. The foam wall structure of claim 14, wherein the foam layer is completely free of halogen containing flame retardant additives.

17. The foam wall structure of claim 6, wherein the adhesive is selected from the group consisting of latex-based adhesives, reactive hot melts, polyester adhesives, polyamide adhesives, acrylic adhesives, one-component epoxy-based adhesives, one-component polyurethane-based adhesives and two-component polyurethane-based adhesives.

18. A foam corner piece suitable for attachment to the wall structure of claim 1, comprising:

a) a generally L-shaped top member b) a generally L-shaped bottom member;

c) at least two corner support members extending between and fixedly attached to the top member and the bottom member; the top member, bottom member and at least two corner support members defining an outer face of the foam corner piece;

d) one or more slabs of polyiso board attached to at least a portion of the outer face of the foam corner piece; the top member, bottom member, at least two corner support members, and the polyiso board defining a cavity within the foam corner piece; and e) foam material deposited into the cavity of the foam corner piece in contact with at least a portion of the polyiso board and at least a portion of the at least two corner support members.

19. The wall structure of claim 1, further comprising a home utility component selected from the group consisting of an electrical wire, a cord, a pipe, and a plumbing fixture disposed in the gap.

20. The wall structure of claim 19, wherein the home utility component does not contact the foam layer.

21. The foam wall structure of claim 1, wherein the polyiso board has a thickness of about ¾" to about 2".

[22. The foam wall structure of claim 1, wherein the foam wall structure has an ultimate load of ≥3,600 lbf when tested according to ASTM E72-05 in the absence of OSB and plywood.]

23. The foam wall structure of claim [22] *1*, wherein the foam wall structure achieves an ultimate load of ≥4,500 lbf when tested according to [ASTME] *ASTM* E-72-05 Testing Standard in the absence of OSB and plywood.

24. A method of manufacturing the foam wall structure of claim 1 comprising:

a) providing a frame with at least one primary support member comprising:

i) a first member;

ii) a second member spaced apart from the first member;

iii) two side members extending between the first and second members, the frame defining a front frame surface and an opposite rear frame surface, wherein the first member, second member, and two side members each have a front surface and a rear surface that form the front frame surface and the rear frame surface of the frame; and iv) at least one primary support member positioned between the two side members and extending between the first and second [member] *members*, wherein the primary support member defines a front primary support surface and an opposite rear primary support surface corresponding to the front frame surface and rear frame surface;

b) providing Type II, Class 2 polyiso board according to ASTM C-1289;

c) orientating the front frame surface over the polyiso board such that the front frame surface is substantially parallel to and in contact with the rear face of the polyiso board;

d) attaching the polyiso board to the front frame surface;

e) depositing foam material into the frame; and f) allowing the foam material to expand within at least a portion of the frame to a position intermediate the front frame surface and the rear frame surface such that a gap is formed within the frame between the foam layer and the rear frame surface.

25. The method according to claim 24, further comprising depositing a layer of foam on the rear face of the polyiso board prior to attaching the polyiso board to the front frame surface.

26. The method according to claim 24, wherein a form is positioned around an outside perimeter of the front frame surface.

27. The method according to claim 24, wherein a form is positioned between adjacent primary support members.

28. The method according to claim 24, wherein the foam material is deposited by an automated dispensing device.

29. The method according to claim 25, wherein the foam layer overlies the front frame surface.

30. The method according to claim 24, wherein the foam layer does not overlie the front frame [surfaces] *surface*.

31. The method of claim 24, wherein the foam layer is formed in-situ during the manufacturing process.

32. The method according to claim 24, further comprising depositing a layer of foam on the front frame surface prior to attaching the rear face of the polyiso board to the front frame surface.

33. A building comprising a foam wall structure and an exterior attachment attached to the foam wall structure, wherein the foam wall structure comprises:

a) a frame comprising:

a first member;

a second member spaced apart from the first member; and two side members extending between the first and second members, wherein the first member, second member, and two side members each have a front surface and a rear surface that form the front frame surface and the rear frame surface of the frame;

b) at least one primary support member positioned between the two side members and extending between the first and second [member] *members*, wherein the primary support member defines a front primary support surface and an opposite rear primary support surface corresponding to the front frame surface and rear frame surface;

c) foam insulation positioned over the front frame surface and between the front frame surface and the exterior attachment, the foam insulation positioned over the front frame surface and between the front frame surface and the exterior attachment consisting of Type II, Class 2 polyiso board according to ASTM C-1289 that is attached to and in contact with [one of] at least a portion of the front frame surface [or at least a portion of the front primary support surface], such that the polyiso board, the first and second members, the two side members and the at least one primary support members define one or more voids within the frame; and d) a foam layer received within at least a portion of one of the voids within the frame, wherein the foam layer adheres to at least a portion of the polyiso board,

*wherein the foam wall structure has an ultimate load of ≥3,600 lbf when tested according to ASTM E72-05 in the absence of OSB and plywood, and* wherein the exterior attachment is made directly to the polyiso board.

34. The building of claim 33, wherein the polyiso board is attached to [the] at least a portion of the front [face] *surface* of the first and second members and the two side members by fasteners.

35. The building of claim 33, wherein the polyiso board is attached to at least a portion of the front [face] *surface* of the first and second members and the two side members by one or more adhesives.

36. The building of claim 35, wherein the adhesive is a thin portion of the foam layer.

37. The building of claim 36, wherein the adhesive is a second foam layer.

38. The building of claim 37, wherein the foam layer comprises polyurethane, polyisocyanurate, or mixtures thereof.

39. The building of claim 38, wherein the foam layer is substantially free of halogen containing flame retardant additives.

40. The building of claim 38, wherein the foam layer is completely free of halogen containing flame retardant additives.

[41. The building of claim 33, wherein the foam wall structure has an ultimate load of ≥3,600 lbf when tested according to ASTM E72-05 in the absence of OSB and plywood.]

42. The building of claim [41] *33*, wherein the foam wall structure achieves an ultimate load of ≥4,500 lbf when tested according to [ASTME] *ASTM* E-72-05 Testing Standard in the absence of OSB and plywood.

43. The building of claim 33, wherein the exterior attachment comprises siding.

*44. The foam wall structure of claim 1, wherein the foam insulation is attached to at least a portion of the front frame surface and at least a portion of the front primary support surface.*

*45. The building of claim 33, wherein the foam insulation is attached to at least a portion of the front frame surface and at least a portion of the front primary support surface.*

* * * * *